United States Patent
Chiu et al.

(10) Patent No.: US 10,347,214 B2
(45) Date of Patent: Jul. 9, 2019

(54) DISPLAY MATRIX, DISPLAY DEVICE AND ASSOCIATED DISPLAY METHOD

(71) Applicant: Wistron Corporation, New Taipei (TW)

(72) Inventors: Pi-Chang Chiu, New Taipei (TW); Kuo-Hua Chen, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 421 days.

(21) Appl. No.: 14/684,541

(22) Filed: Apr. 13, 2015

(65) Prior Publication Data
US 2016/0104455 A1    Apr. 14, 2016

(30) Foreign Application Priority Data
Oct. 13, 2014    (TW) .............................. 103135348 A (51) Int. Cl.
*G09G 5/12* (2006.01)
*G06F 3/14* (2006.01)

(52) U.S. Cl.
CPC ............. *G09G 5/12* (2013.01); *G06F 3/1423* (2013.01); *G06F 3/1446* (2013.01); *G09G 2370/022* (2013.01); *G09G 2370/025* (2013.01)

(58) Field of Classification Search
None
See application file for complete search history.

(56) References Cited

U.S. PATENT DOCUMENTS

| 6,970,145 | B1* | 11/2005 | Aoki ..................... G06F 3/1431 345/1.2 |
| 2015/0195342 | A1* | 7/2015 | Panvelwala ............. H04L 67/10 709/203 |
| 2016/0062725 | A1* | 3/2016 | Odagiri ................ G06F 3/1446 345/1.3 |

FOREIGN PATENT DOCUMENTS

| CN | 101436396 A | 5/2009 |
| CN | 103366714 A | 10/2013 |
| DE | 102011112629 A1 | 1/2013 |

OTHER PUBLICATIONS

TIPO Office Action dated May 4, 2016 in corresponding TW application (No. 103135348).
English translation of TIPO Office Action dated May 4, 2016 in corresponding TW application (No. 103135348).
CN Office Action dated May 3, 2018 in Chinese application (No. 201410608813.9).

* cited by examiner

*Primary Examiner* — Duane N Taylor, Jr.
(74) *Attorney, Agent, or Firm* — McClure, Qualey & Rodack, LLP (57) ABSTRACT

A display matrix, a display device and an associated display method are provided. The display matrix includes a first display device and a second display device. The first display device transmits a source image at a first transmitting time point. The second display device is serially connected to the first display device via a daisy chain. The first display device and the second display device are arranged in a matrix. The second display device receives the source image via the daisy chain at a second receiving time point. The first display device displays the source image at a first display time point. The first display time point is the same as or later than the second receiving time point.

11 Claims, 8 Drawing Sheets

| relative position in display matrix | (1, 1) |
|---|---|
| serial position | 1 |
| display matrix arrangement | 4*2 |
| total number of display devices in daisy chain | 8 |

DISPLAY MATRIX, DISPLAY DEVICE AND ASSOCIATED DISPLAY METHOD

This application claims the benefit of Taiwan application Serial No. 103135348, filed Oct. 13, 2014, the subject matter of which is incorporated herein by reference.

BACKGROUND OF THE INVENTION

Field of the Invention

The invention relates in general to a display matrix, a display device and its associated display method, and more particularly to a display matrix, a display device and its associated display method for synchronously displaying a source image.

Description of the Related Art

To publicize or market information, many companies mount huge television walls (display matrices) in the interior hallways or at outdoor locations with crowds. The object is to attract the attention of the masses via various types of display images displayed on the huge display matrix.

The conventional display matrix outputs the display images in parallel. That is, a distributor provides the source image to each display device. Such the method needs to additionally use a distributor, and cables between the distributor and each display device.

In order to decrease the installation cost, a display matrix serially connecting multiple display devices via a daisy chain is developed. In short, the display devices mounted in the daisy chain are connected in series according to the linking order, and the source image is sequentially transmitted between the display devices according to the serial connection order.

Figure 1A:
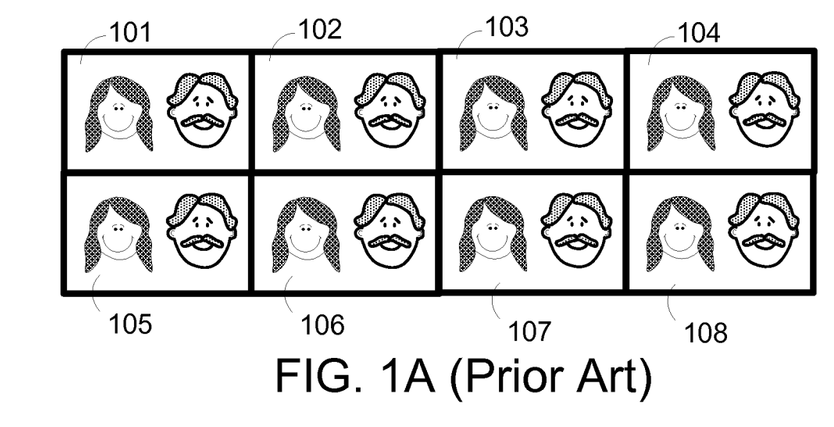
FIG. 1A (prior art) is a schematic view showing a huge image composed of 4×2 display images.

FIG. 1A is a schematic view showing a huge image composed of 4×2 display images. Referring to FIG. 1A, it is assumed that the display images 101, 102, 103, 104, 105, 106, 107 and 108 commonly constitute the huge image.

Figure 1B:
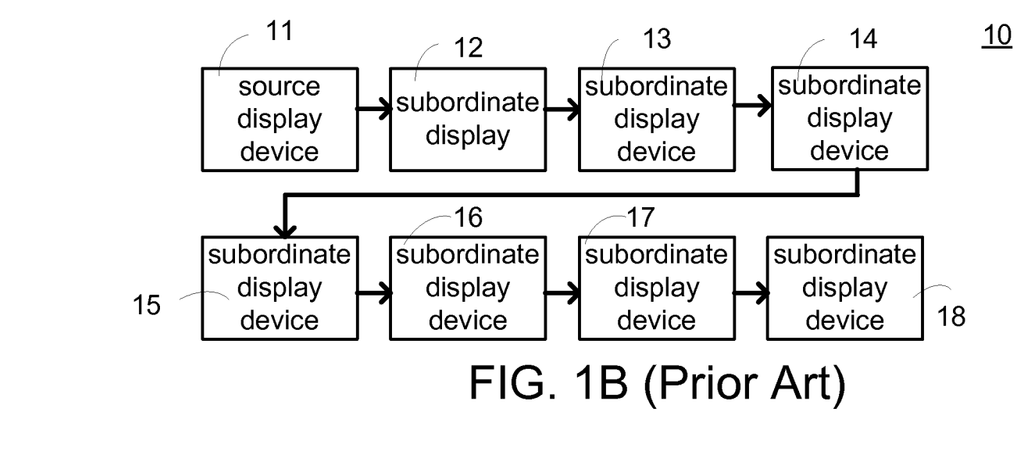
FIG. 1B (prior art) is a schematic view showing a display matrix composed of 4×2 display devices.

FIG. 1B is a schematic view showing a display matrix composed of 4×2 display devices. In FIG. 1B, there are four display devices in each row, and there are two rows of display devices to constitute the display matrix 10. The arrangement of FIG. 1B corresponds to that of the display images of FIG. 1A. In order to generate the effect of the television wall, the display devices in the display matrix 10 needs to commonly output the display image, and the content (source image) of the display image needs to be transmitted from a source display device 11 to subordinate display devices 12, 13, 14, 15, 16, 17 and 18 in order. That is, the source image is transmitted from the source display device 11 to the subordinate display device 12, then from the display device 12 to the display device 13, and so on.

Because the subordinate display devices 12, 13, 14, 15, 16, 17 and 18 need to receive the source image from the previous stage of display device in the daisy chain, the time points that the subordinate display devices 12, 13, 14, 15, 16, 17 displaying the source image are inconsistent. This is because the time point of receiving the source image by the display device is earlier than the time point of receiving the source image by the next display device. For example, the source display device 11 displays the source image at the first time point t1, and the subordinate display device 12 displays the source image at the second time point t2, wherein a transmitting time difference $\Delta T$ (for example, ranging from 3 ms to 10 ms) is present between the second time point t2 and the first time point t1. With the increase of the number of the display devices in the display matrix, the transmitting time difference caused by the serial connected display devices gets longer. Consequently, the delay phenomenon watched by the user on the display device gets more serious.

SUMMARY OF THE INVENTION

The invention is directed to a display matrix, a display device and an associated display method.

According to a first aspect of the present invention, a display matrix is provided. The display matrix includes a first display device and a second display device. The first display device transmits a source image at a first transmitting time point. The second display device is serially connected to the first display device via a daisy chain. The display devices are arranged in a matrix. The second display device receives the source image via the daisy chain at a second receiving time point, and the first display device displays the source image at a first display time point. The first display time point is the same as or later than the second receiving time point.

According to a second aspect of the present invention, a display device located at a display matrix is provided. The display device is serially connected to other display devices in the display matrix via a daisy chain, and the display devices are arranged in a matrix. The display device includes an image transmission interface and a display panel. The image transmission interface transmits a source image at a transmitting time point. The display panel displays the source image at a display time point according to a relative position of the display device in the display matrix. The display time point is later than the transmitting time point.

According to a third aspect of the present invention, a display method applied to a display matrix including a first display device and a second display device is provided. The second display device is serially connected to the first display device via a daisy chain, and the display devices are arranged in a matrix. The display method includes the following steps. The first display device transmits a source image at a first transmitting time point; the second display device receives the source image via the daisy chain at a second receiving time point; and the first display device displays the source image at a first display time point. In addition, the first display time point is the same as or later than the second receiving time point.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 2:
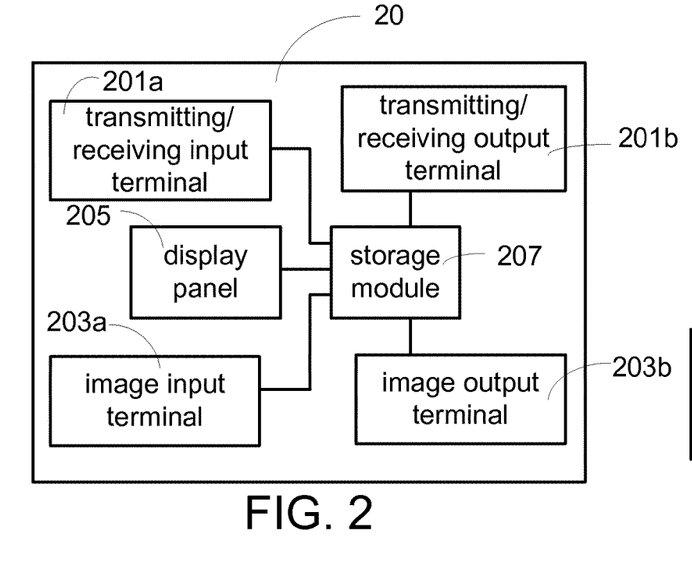
FIG. 2 is a schematic view showing a display device according to an embodiment of the invention.

FIG. 2 is a schematic view showing a display device according to an embodiment of the invention. Referring to FIG. 2, the display device 20 of the invention includes a display panel 205, a storage module 207 and an image transmission interface (including an image input terminal 203a and an image output terminal 203b). In addition, the display device 20 further includes a control signal transmission interface (including a transmitting/receiving input terminal 201a and a transmitting/receiving output terminal 201b). The storage module 207 is electrically connected to the display panel 205, the image transmission interface, and the control signal transmission interface.

The control signal transmission interface may be RS232 for connecting the display devices in series and transmitting the arrangement information of the display matrix. The image transmission interface may be a display port (hereinafter referred to as DP) or the HDMI interface for transmitting the source image. Alternatively, the control signal transmission interface and the image transmission interface may be integrated together. For example, a universal serial bus (USB) may be used to transmit the control signal and the image concurrently. The storage module 207 may include a volatile storage medium (for example, a dynamic random access memory (DRAM) and a non-volatile storage medium (for example, electrically-erasable programmable read-only memory (EEPROM) or flash memory). The volatile storage medium temporarily stores the source image, while the non-volatile storage medium stores the arrangement information of the display matrix.

Figure 3:
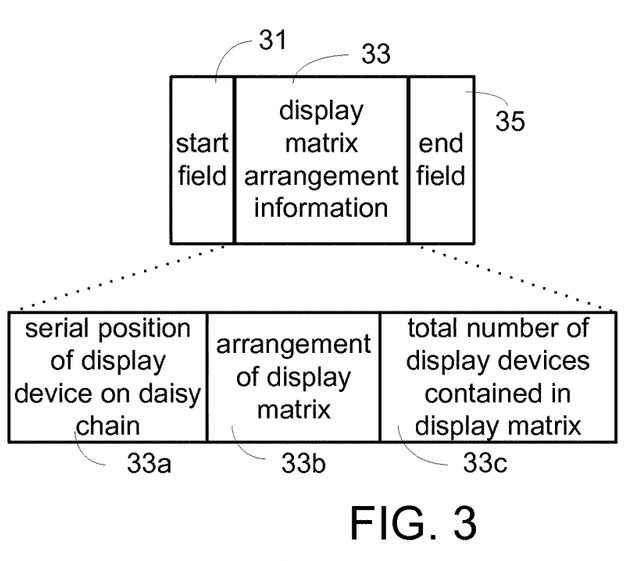
FIG. 3 is a schematic view showing a storage module utilized to store arrangement information of the display matrix according to the embodiment of the invention.

FIG. 3 is a schematic view showing a storage module utilized to store arrangement information of the display matrix according to the embodiment of the invention. Referring to FIG. 3, the display matrix arrangement information 33 is stored according to the storage format specified by the storage module 207. A start field 31 and an end field 35 may also be provided before and after the display matrix arrangement information 33, respectively. Consequently, when the display device fetches content of the storage module 207, the storage position corresponding to the display matrix arrangement information 33 can be easily identified.

The display matrix arrangement information 33 may include, but without limitation to, the serial position of the display device in the daisy chain 33a, the arrangement of the display matrix 33b, the total number of display devices contained in the display matrix 33c, and the like.

Figure 4:
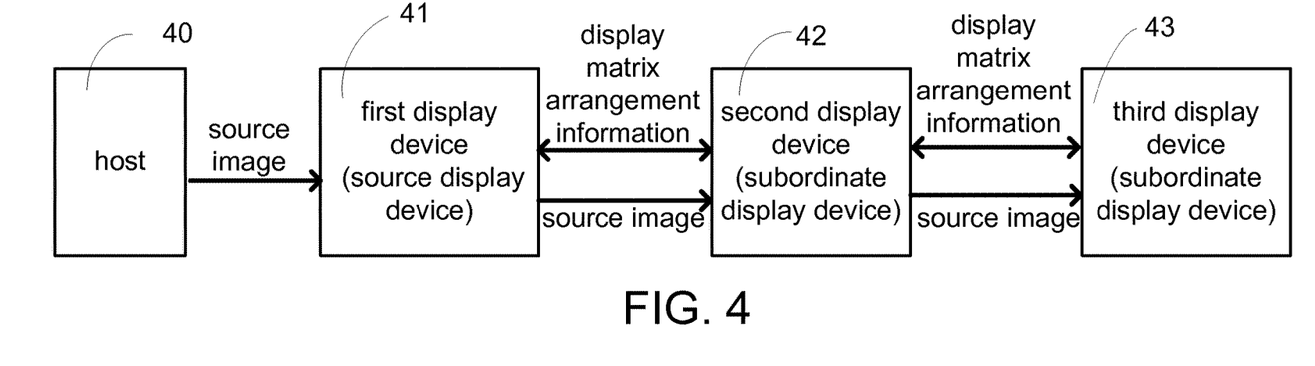
FIG. 4 is a schematic view showing that the arrangement information and the source image are transmitted between the display devices of the display matrix according to the invention.

FIG. 4 is a schematic view showing that the arrangement information and the source image are transmitted between the display devices of the display matrix according to the invention. Referring to FIG. 4, before the source image is displayed, the first display device 41, the second display device 42 and the third display device 43 can identify which display devices in the display matrix are commonly used, how the display devices are arranged, and the like via the control signal transmission interface. In other words, before the source image is transmitted, each display device obtains and stores the display matrix arrangement information in advance.

After the host 40 transmits the source image to the first display device 41, the first display device 41 temporarily stores the source image without real-time displaying the source image. Because the daisy chain totally has three display devices, and the first display device 41 is disposed at the front end position of the daisy chain, it represents that the source image transmitted from the first display device 41 has to be forwarded twice. In order to prevent the inconsistent display time points caused by the two forwarding operations, the first display device 41 will wait two times of a transmitting time difference (ΔT×2), and then starts to display the source image.

Next, after the first display device 41 transmits the source image to the second display device 42, the second display device 42 temporarily stores the source image without real-time display. Because there are totally two subordinate display devices in the daisy chain, it represents that the source image transmitted from the second display device 42 needs to be transmitted once. Thus, the second display device 42 will wait one transmitting time difference (ΔTx 1), and then starts to display the source image. The second display device 42 is disposed in the daisy chain, so the time when the second display device 42 actually displays the source image is later than the time when the source image is received.

Thereafter, after the second display device 42 transmits the source image to the third display device 43, the third display device 43 starts to broadcast the source image because the third display device 43 identifies the third display device 43 as the last display device in the daisy chain. The third display device 43 is disposed at the rear end position of the daisy chain, so the third display device 423 immediately displays the source image after receiving the source image.

Figure 5A:
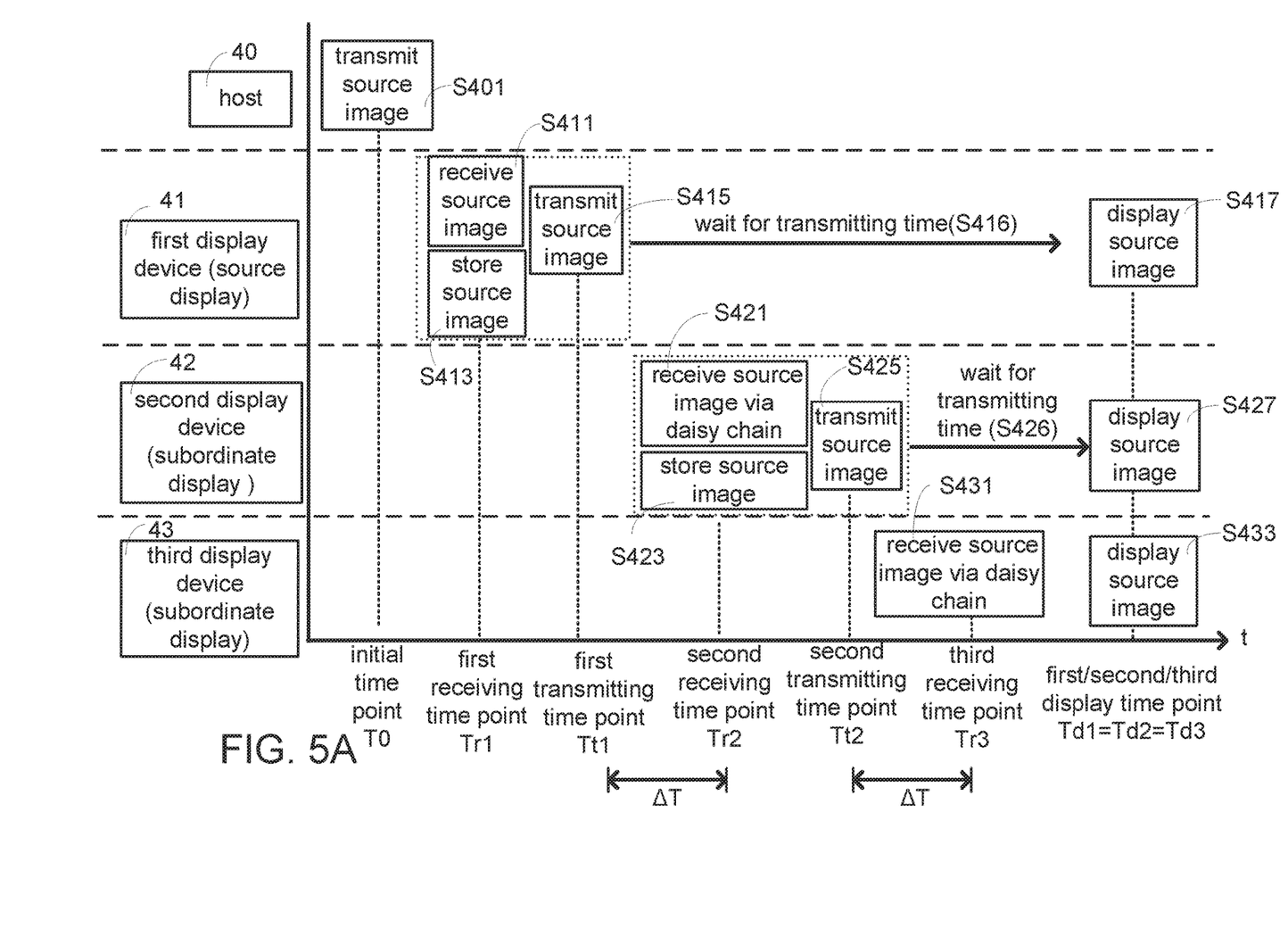
FIG. 5A is a schematic view showing one method of the display device of transmitting the display arrangement information according to the embodiment of the invention.

FIG. 5A is a schematic view showing the steps executed by the host and each display device when the display matrix adopts the serial connection format of FIG. 4. In FIG. 5A, the steps executed in correspondence with the host 40, the first display device 41, the second display device 42 and the third display device 43 are depicted from top to bottom. In the drawing, the left-to-right direction represents the order of time. First, the host 40 transmits the source image to the first display device 41 at the initial time point TO (step S401);

and then the first display device 41 receives the source image (step S411) and temporarily stores the source image (step S413) at the first receiving time point Tr1. The first display device 41 transmits the source image to the second display device 42 at the first transmitting time point Tt1 (step S415). Upon the practical application, the first receiving time point Tr1 and the first transmitting time point Tt1 may be very close to each other (that is, it may be regarded as Tr1=Tt1). Thereafter, the first display device 41 will wait for the transmitting time (step S416). Finally, the first display device 41 displays the source image at the first display time point Td1 (step S417).

After the source image is transmitted from the first display device 41 and a transmitting time difference ΔT has elapsed, the second display device 42 receives the source image via the daisy chain (step S421) and temporarily stores the source image (step S423) at the second receiving time point Tr2. The second display device 42 transmits the source image to the third display device 43 (step S425) at the second transmitting time point Tt2. Upon the practical application, the second receiving time point Tr2 and the second transmitting time point Tt2 may be very close to each other (that is, it may be regarded as Tr2=Tt2). Thereafter, the second display device 42 waits for the transmitting time (step S426). Finally, second display device 42 displays the source image (step S427) at the second display time point Td2.

After the second display device 42 transmits the source image and one transmitting time difference ΔT has elapsed, the third display device 43 can receive the source image via the daisy chain at the third receiving time point Tr3 (step S431). The third display device displays the source image at the third display time point Td3 (step S433). According to the idea of the invention, the first display time point Td1, the second display time point Td2 and the third display time point Td3 are the same time point. Upon the practical application, the third receiving time point Tr3 and the third display time point Td3 may be very close to each other (that is, it may be regarded as Tr3=Td3).

Figure 5B:
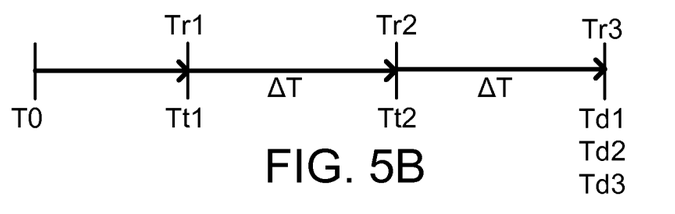
FIG. 5B is a schematic view showing timing relationships of FIG. 5A.

FIG. 5B is a schematic view showing timing relationships of FIG. 5A. Referring to FIG. 5B, the corresponding positions of the time points of FIG. 5A are further arranged in this drawing. For the sake of illustration, it is assumed that the first receiving time point Tr1 and the first transmitting time point Tt1 are the same (Tr1=Tt1); the second receiving time point Tr2 and the second transmitting time point Tt2 are the same (Tr2=Tt2); and the third receiving time point Tr1, the first display time point Td1, the second display time point Td2 and the third display time point Td3 are the same (Tr3=Td1=Td2=Td3).

It is to be noted that with the change of the number of display devices and the and serial connection format in the daisy chain and the matrix, the relationships between the transmitting time point, the receiving time point and the display time point corresponding to each display device also changes therewith.

Figure 6:
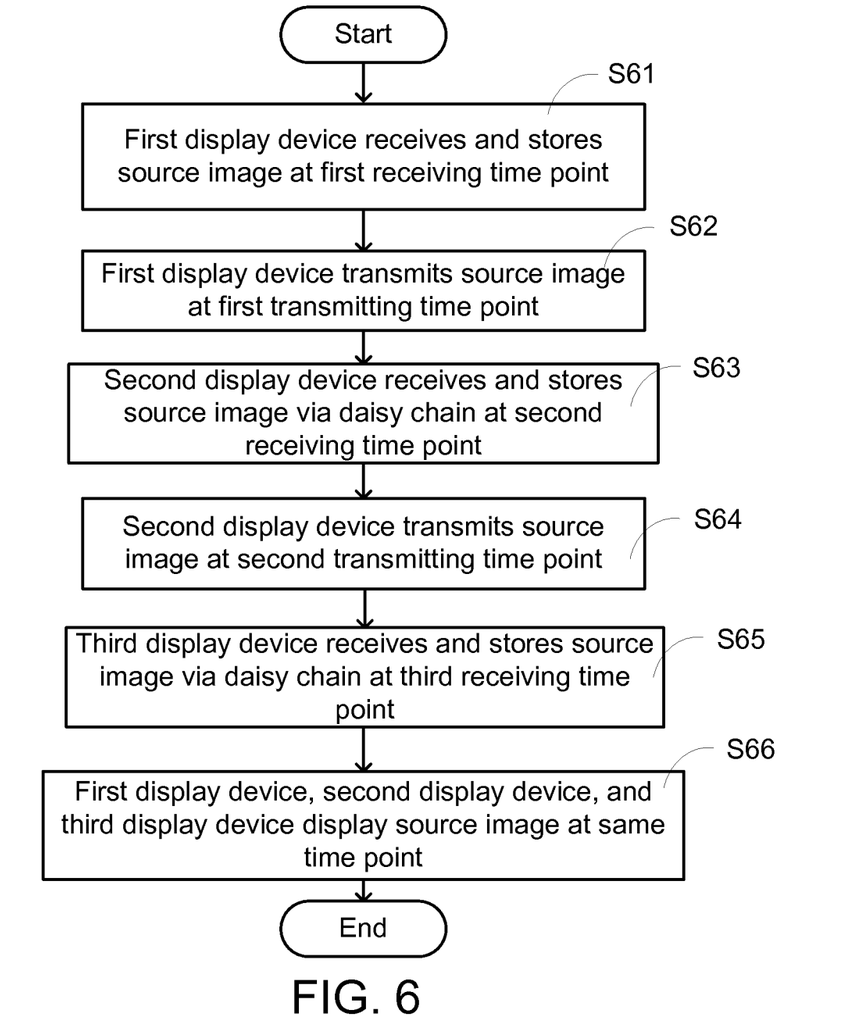
FIG. 6 is a flow chart showing a display method applied to the display matrix of FIG. 3 according to the embodiment of the invention.

FIG. 6 is a flow chart showing a display method applied to the display matrix of FIG. 3 according to the embodiment of the invention. First, the first display device 41 receives the source image from the host 40, and the first display device 41 stores the source image at the first receiving time point (step S61). Next, the first display device 41 transmits the source image at the first transmitting time point (step S62). Then, the second display device 42 receives and stores the source image via the daisy chain at the second receiving time point (step S63). The second display device 42 transmits the source image at the second transmitting time point (step S64). The third display device 43 receives and stores the source image via the daisy chain at the third receiving time point (step S65). Finally, the first display device 41, the second display device 42 and the third display device 43 display the source image at the same time point (step S66).

It is unnecessarily for the display devices in the display matrix to display the complete source image. In some applications, each of the display devices of the display matrix displays the same source image.

Figure 7A:
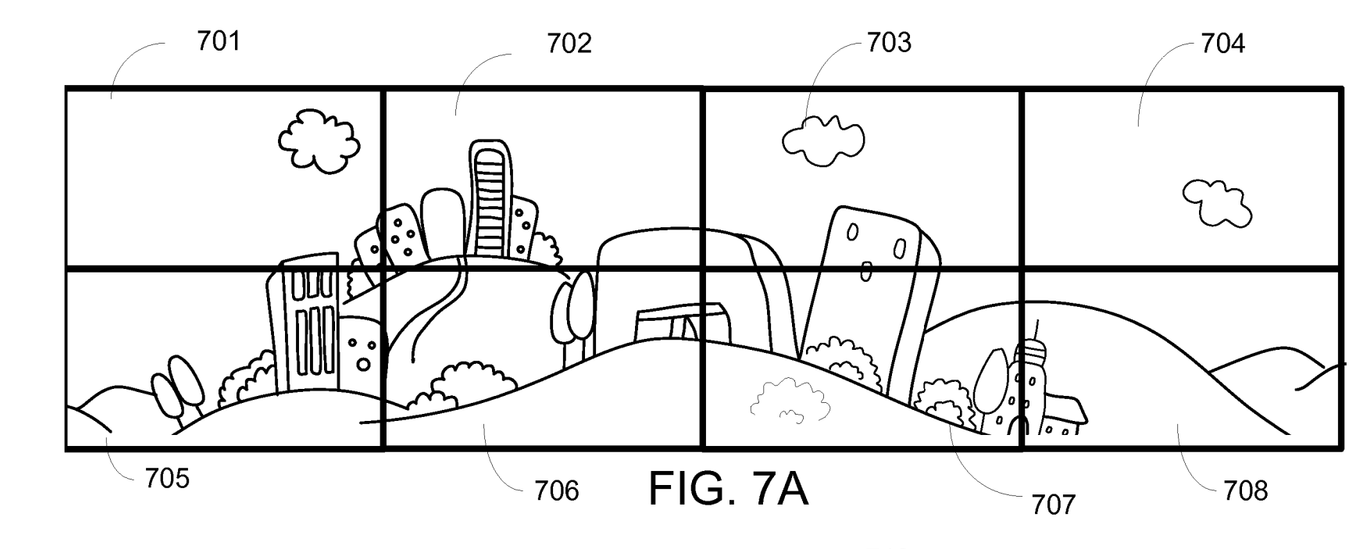
FIG. 7A is a schematic view showing the source image divided into 8 display images.

FIG. 7A is a schematic view showing the source image divided into 8 display images. This drawing assumes that the source image outputted from the host is to be displayed by the display devices arranged in the 4×2 matrix, so the source image is divided into the display images 701, 702, 703, 704, 705, 706, 707 and 708.

Figure 7B:
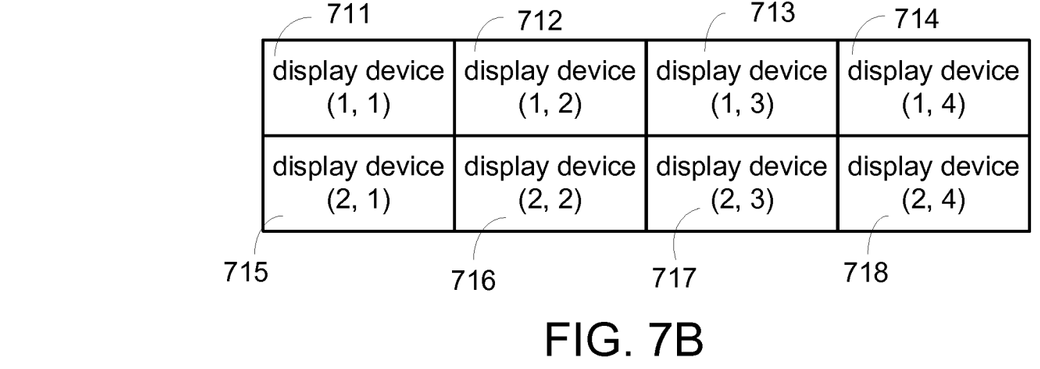
FIG. 7B is a schematic view showing the display devices arranged in the 4×2 matrix and commonly displaying the source image.

FIG. 7B is a schematic view showing the display devices arranged in the 4×2 matrix and commonly displaying the source image. According to the idea of the invention, each display device may be set by the user via the on screen display (OSD), or may be connected using the control signal transmission interface (for example, RS232) in conjunction with the detection software to determine the total number of the display devices included in the display matrix, the corresponding serial position of the individual display device in the display matrix, and the sorting (numbering) of the individual display device in the daisy chain.

According to the idea of the invention, when the display matrix uses the display devices to commonly display a huge source image, the contents of the complete source image are still transmitted between the display devices, but each display device can display the corresponding portion according to its relative position in the display matrix. When the source display device receives the source image from the host, the subordinate display device receives the source image from the source display device, or the subordinate display device receives the source image from a subordinate display device at previous stage, the corresponding portion can be captured from the source image according to the relative position in the display matrix and the serial position in the daisy chain. In short, the display device can refer to the arrangement information and captures the portion, corresponding to its position in the matrix, from the source image, and then only displays its corresponding portion of the source image. In the following embodiment, it is assumed that each of the display devices in the display matrix displays one portion of the source image. Upon the practical application, each display device in the display matrix may also independently display the same source image (see FIG. 1A, for example).

The display device 711 is located at the relative position (1, 1) in the display matrix and displays the display image 701. Thus, although the display device 711 receives the complete source image, the display device 711 displays the partial contents at the upper left corner of the source image. Similarly, the display devices 712, 713 and 714 are located at the relative positions (1, 2), (1, 3) and (1, 4) in the display matrix, and displays the display images 702, 703 and 704, respectively.

The display device 715 is located at the relative position (2, 1) in the display matrix, and displays the display image 705. Thus, although the display device 715 receives the complete source image, it only displays the partial contents at the upper left corner of the source image. Similarly, the display devices 716, 717 and 718 are located at the relative positions (2, 2), (2, 3) and (2, 4) of the display matrix, and display the display images 716, 717 and 708, respectively.

Figure 8A:
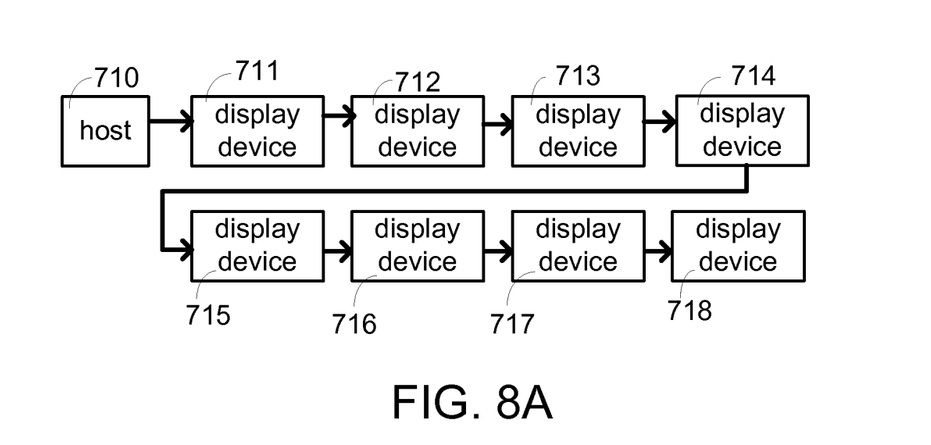
FIG. 8A is a schematic view showing one method of the display device transmitting the source image when the display matrix has the display device arranged in the 4×2 matrix according to the embodiment of the invention.
Figure 8B:
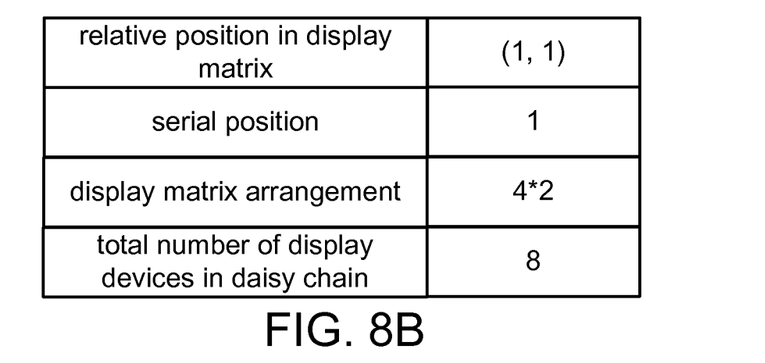
FIG. 8B is a schematic view showing the arrangement information of the display devices by way of an example.

It is to be noted that the order of the display devices in the daisy chain and the relative positions thereof in the display matrix do not have the absolute relationships. FIGS. 8A and 8B illustrate that the order of the serially-connected display devices in the daisy chain still can be changed when the same display matrix arrangement is adopted.

FIG. 8A is a schematic view showing one method of the display device transmitting the source image when the display matrix has the display device arranged in the 4×2 matrix according to the embodiment of the invention. It is assumed that the host 710 transmits the source image to the display device 711 (source display device) located at the first row and first column. Next, the source image is transmitted to the display device 712 from the display device 711, and successively transmitted between the display devices 712, 713, 714, 715, 716, 717 and 718.

In FIG. 8A, the storage module of the display device 711 stores the relative position in the display matrix as (1, 1), stores the serial position number as 1, stores the display matrix arrangement as 4×2, and stores the total number of the display devices as 8. Because the total number of the display devices is 8, and the display device 711 is located at the serial position number 1, there is seven times of the transmitting time difference (7*ΔT) present between the time point when the source image is actually transmitted to the last display device 718 in the daisy chain, and the time point when the source image is actually transmitted to the display device 711. Thus, the display device 711 will not immediately display the corresponding portion after receiving the source image. After waiting the period of ΔT×7, the display device 711 displays the portion corresponding to the display image 701 in the source image.

In FIG. 8A, the storage module of the display device 716 stores the relative position in the display matrix as (2, 2), stores the serial position number as 6, stores the display matrix arrangement as 4×2, and stores the total number of the display devices as 8. Because the total number of the display devices is 8 and the display device 716 is located at the serial position number 6, there is two times of the transmitting time difference (ΔT×2) present between the time point when the source image is actually transmitted to the last display device 718 in the daisy chain, and the time point when the source image is actually transmitted to the display device 716. Thus, the display device 716 will not immediately display the corresponding portion after receiving the source image. After waiting the period of ΔT×2, the display device 716 displays the portion corresponding to the display image 706 in the source image.

In FIG. 8A, the storage module of the display device 718 stores the relative position in the display matrix as (2, 4), stores the serial position number as 8, stores the display matrix arrangement as 4×2, and stores the total number of the display devices as 8. Because the total number of the display devices is 8 and the display device 718 is located at the serial position number 8, the display device 718 has already become the last display device in the daisy chain. Thus, the display device 718 immediately displays the portion corresponding to the display image 708 in the source image after receiving the source image.

The display device 713 further transmits the source image to the display device 714 after receiving the source image. The display device 714 further transmits the source image to the display device 718 via the display devices 715, 716 and 717 after receiving the source image.

According to the idea of the invention, the display devices serially connected in the same daisy chain actually display the source image at the same time. According to the above-identified description, it is obtained that the display device located at the relatively front end position in the daisy chain has to wait the longer time after the source image is transmitted because the transmitting time difference is relatively longer. On the other hand, the display device located at in the daisy chain relatively rear end position has to wait the shorter time to display the source image after the source image is transmitted because the transmitting time difference is relatively shorter. In other words, the display device receiving the source image earlier waits the longer transmitting time difference, and the display device receiving the source image later waits the shorter transmitting time difference. Thus, the display matrix according to the embodiment of the invention can make the display devices display the source image at the same time point. In other words, the display devices synchronously display the contents of the source image, so that the user will not feel the image delay phenomenon.

FIG. 8B is a schematic view showing the arrangement information of the display devices by way of an example. The arrangement information of this drawing is based on the display device 711 of FIG. 8B as an example. According to the idea of the invention, regarding the arrangement information of FIG. 8B, the display device 711 can display the setting page via the OSD, and the user performs the setting via an input interface (remote controller, touch screen or the like). Thereafter, the setting of the arrangement information is stored in the storage module of the display device 711.

Alternatively, an internal arrangement detecting program can be executed between the display devices 711, 712, 713, 714, 715, 716, 717 and 718 of FIG. 8A via the data connection method to obtain various kinds of arrangement information in the same display matrix by way of handshaking. Before the source image is actually transmitted, the arrangement information of the display matrix can be identified between the display devices via the data connection, that is, control signal transmission interface, or the image transmission cable transmission interface, in conjunction with the executing of the arrangement detecting program. Alternatively, the user can manually set the arrangement information of the display matrix. The associated application of this portion after the arrangement information is obtained can be freely applied by those skilled in the art, and detailed descriptions thereof will be omitted.

Figure 9A:
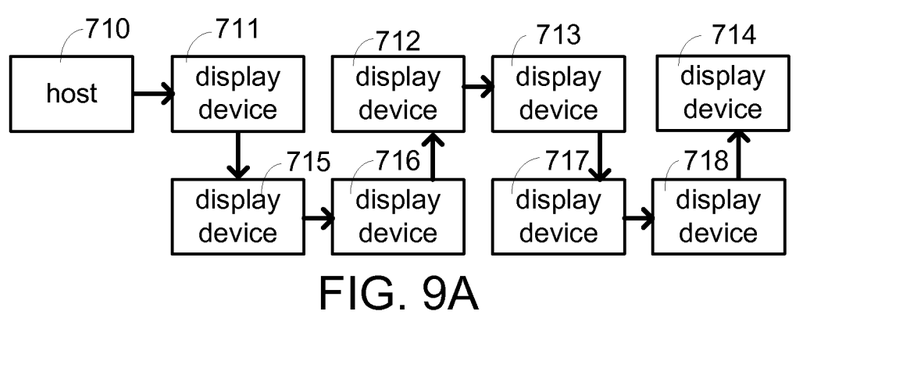
FIG. 9A is a schematic view showing another method of the display device transmitting the source image when the display matrix has the display device arranged in the 4×2 matrix according to the embodiment of the invention.

FIG. 9A is a schematic view showing another method of the display device transmitting the source image when the display matrix has the display device arranged in the 4×2 matrix according to the embodiment of the invention. In FIG. 9A, it is assumed that the host 710 transmits the source image to the display device 711 (source display device) located at first row and first column. Next, the source image is transmitted from the display device 711 to the display device 715, and successively transmitted between the display devices 715, 716, 712, 713, 717, 718 and 714. Comparing FIG. 8A with FIG. 9A, it is obtained that although the display devices 711 serving as the source display devices connected to the hosts 710 are the same, the serial connection order of the serially connected display devices 712, 713, 714, 715, 716, 717 and 718, subsequently serving as the subordinate display device in FIG. 9A, has been changed.

In FIG. 9A, the storage module of the display device 711 stores the relative position in the display matrix as (1, 1), stores the serial position number as 1, stores the display matrix arrangement as 4×2, and stores the total number of the display devices as 8. Because the total number of the display devices is 8 and the display device 711 is located at the serial position number 1, there is seven times of the transmitting time difference (ΔT×7) present between the time point when the source image is actually transmitted to the last display device 714 in the daisy chain, and the time point when the source image is actually transmitted to the display device 711. Thus, the display device 711 will not immediately display the corresponding portion after receiving the source image. The display device 711 displays the portion corresponding to the display image 701 in the source image after waiting the period of ΔT×7.

In FIG. 9A, the storage module of the display device 716 stores the relative position in the display matrix as (2, 2), stores the serial position number as 3, stores the display matrix arrangement as 4×2, and stores the total number of the display devices as 8. Because the total number of the display devices is 8 and the display device 716 is located at the serial position number 3, there is five times of the transmitting time difference (ΔT×5) present between the time point when source image is actually transmitted to the last display device 714 in the daisy chain and the time point when the source image is actually transmitted to the display device 716. Thus, the display device 716 will not immediately display the corresponding portion after receiving the source image. The display device 716 displays the portion corresponding to the display image 706 in the source image after waiting the period of ΔT×5.

In FIG. 9A, the storage module of the display device 718 stores the relative position in the display matrix as (2, 4), stores the serial position number as 7, stores the display matrix arrangement as 4×2, and stores the total number of the display devices as 8. Because the total number of the display devices is 8, and the display device 718 is located at the serial position number 7, there is one transmitting time difference ΔT present between the time point when the source image is actually transmitted to the last display device 714 in the daisy chain, and the time point when the source image is actually transmitted to the display device 718. Thus, the display device 718 will not immediately display the corresponding portion after receiving the source image. The display device 718 temporarily stores the source image and waits the period of ΔT, and then displays the portion corresponding to the display image 708 in the source image. The time points when the other display devices of FIG. 9A receive and display the source image may also be analogized according to the above-mentioned descriptions, and detailed descriptions thereof will be omitted.

Figure 9B:
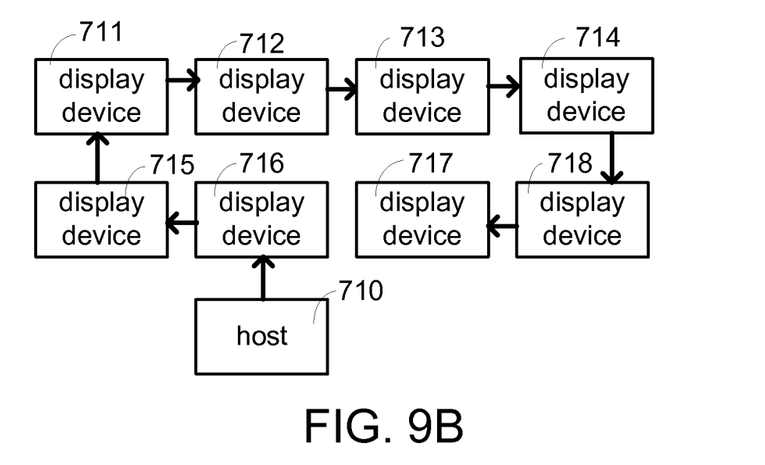
FIG. 9B is a schematic view showing still another method of the display device transmitting the source image when the display matrix has the display device arranged in the 4×2 matrix according to the embodiment of the invention.

FIG. 9B is a schematic view showing still another method of the display device transmitting the source image when the display matrix has the display device arranged in the 4×2 matrix according to the embodiment of the invention. In FIG. 9B, it is assumed that the host 710 transmits the source image to the display device 716 (source display device) located at the second row and second column. Next, the source image is transmitted from the display device 716 to the display device 715, and successively transmitted between the display devices 711, 712, 713, 714, 718 and 717. Compared with FIG. 9A, the source display device of FIG. 9B to be connected to the host 710 is the display device 716. Because the position of the source display device is changed, the serial connection formats of other display devices are also changed correspondingly.

In FIG. 9B, the storage module of the display device 711 stores the relative position in the display matrix as (1, 1), stores the serial position number as 3, stores the display matrix arrangement as 4×2, and stores the total number of the display devices as 8. Because the total number of the display devices is 8, and the display device 711 is located at the serial position number 3, there is five times of the transmitting time difference (ΔT×5) present between the time point when the source image is actually transmitted to the last display device 717 in the daisy chain, and the time point when the source image is actually transmitted to the display device 711. Thus, the display device 711 will not immediately display the corresponding portion after receiving the source image. The display device 711 displays the portion corresponding to the display image 701 in the source image after waiting the period of ΔT×5.

In FIG. 9B, the storage module of the display device 716 stores the relative position in the display matrix as (2, 2), stores the serial position number as 1, stores the display matrix arrangement as 4×2, and stores the total number of the display devices as 8. Because the total number of the display devices is 8, and the display device 716 is located at the serial position number 1, there is seven times of the transmitting time difference (ΔT×7) present between the time point when the source image is actually transmitted to the last display device 717 in the daisy chain, and the time point when the source image is actually transmitted to the display device 716. Thus, the display device 716 will not immediately display the corresponding portion after receiving the source image. The display device 716 displays the portion corresponding to the display image 706 in the source image after waiting the period of ΔT×7.

In FIG. 9B, the storage module of the display device 718 stores the relative position in the display matrix as (2, 4), stores the serial position number as 7, stores the display matrix arrangement as 4×2, and stores the total number of the display devices as 8. Because the total number of the display devices is 8, and the display device 716 is located at the serial position number 7, one transmitting time difference ΔT×1 is present between the time point when the source image is actually transmitted to the last display device 717 in the daisy chain, and the time point when the source image is actually transmitted to the display device 718. Thus, the display device 718 will not immediately display the corresponding portion after receiving the source image. The display device 718 displays the portion corresponding to the display image 708 in the source image after waiting the period of ΔT×1. The time points when the other display devices of FIG. 9B receive and display the source image may also be analogized according to the above-mentioned descriptions, and detailed descriptions thereof will be omitted.

Comparing the serial connection format and description of FIG. 9A with those of FIG. 9B, it is obtained that the display method of the invention can very freely broadcast the source image in correspondence with various arrangements and connection orders of the display devices. Furthermore, the display matrix adopting the idea of the invention can also freely and synchronously broadcast the source image in each display device in correspondence with various arrangements and connection orders of the display devices.

Figure 10A:
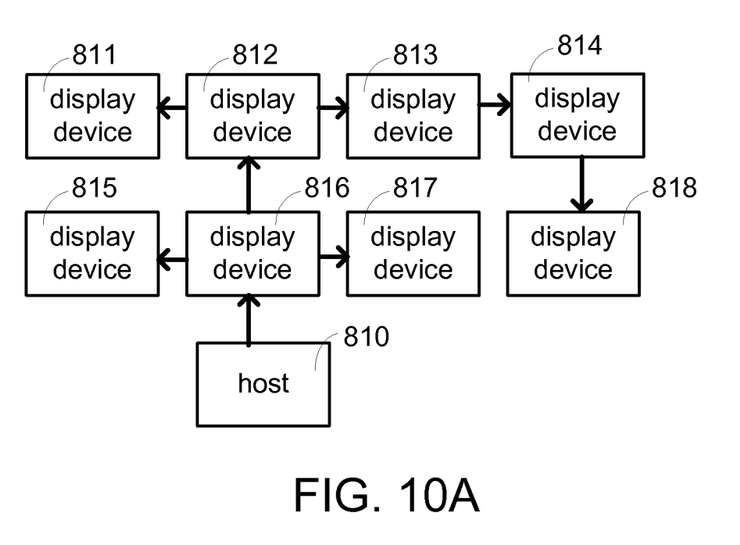
FIGS. 10A and 10B are schematic views showing the display matrix for transmitting the source image via daisy chains according to the embodiments of the invention.
Figure 10B:
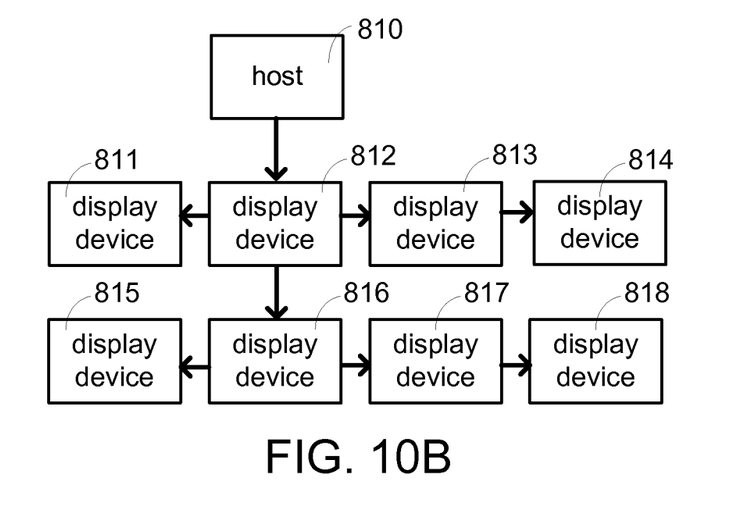

FIGS. 10A and 10B are schematic views showing the display matrix for transmitting the source image via daisy chains according to the embodiments of the invention. The two embodiments further describe that the idea of the invention freely adjusts the time when each display device displays the source image in correspondence with the actual arrangement of the display devices. The methods for the storage module of each display device to store the serial position (number), the display matrix arrangement and the total number of the display devices are similar to those described hereinabove, and detailed descriptions thereof will be omitted.

In FIG. 10A, it is assumed that the host 810 transmits the source image to the display device 816 (source display device) located at the second row and second column. Next, the source image is transmitted from the display device 816 to the display devices 811, 812, 813, 814, 815, 817 and 818 via four daisy chains.

The display device 816 and the display device 815 form a first daisy chain. One transmitting time difference ΔT×1 is present between the display device 816 and the display device 815.

The display device 816 and the display device 817 form a second daisy chain. One transmitting time difference ΔT×1 is present between the display device 816 and the display device 817.

After the display device 816 transmits the source image to the display device 812, two daisy chains are further branched. One daisy chain transmits the source image from the display device 812 to the display device 811. The other daisy chain sequentially transmits the source image from the display device 812 to the display devices 813, 814 and 818. One transmitting time difference ΔT×1 is present between the display device 816 and the display device 812. Two times of the transmitting time difference ΔT×2 is present between the display device 816 and the display device 811. Two, three and four times of the transmitting time difference ΔT×2, ΔT×3, ΔT×4 are present between the display device 816 and the display devices 813, 814 and 818, respectively.

In this embodiment, the display device 818 last receives the source image, so the time points when the other display devices 811, 812, 813, 814, 815, 816 and 817 actually display the source image are later than the time points when they receive the source image.

For example, the display device 816 waits the period of ΔT×4, and then displays the portion corresponding to the display device 816 in the source image. The display devices 812, 815 and 817 wait the period of ΔT×3, and then display the portions corresponding to the display devices 812, 815 and 817 in the source image, respectively. The display devices 811 and 813 wait the period of ΔT×2, and then display the portions corresponding to the display devices 811 and 813 in the source image, respectively. The display device 814 waits the period of ΔT×1, and then displays the portion corresponding to the display device 814 in the source image. The display device 818 immediately displays the portion corresponding to the display device 818 in the source image after receiving the source image.

In FIG. 10B, it is assumed that the host 810 transmits the source image to the display device 812 (source display device) located at first row and second column. Next, the source image is transmitted from the display device 812 to the display devices 811, 813, 814, 815, 816, 817 and 818 via four daisy chains.

In FIG. 10B, the display device 812 waits the period of ΔT×3, and then displays the portion corresponding to the display device 812 in the source image. The display devices 811, 813 and 816 wait the period of ΔT×2, and then display the portions corresponding to the display devices 811, 813 and 816 in the source image, respectively. The display devices 814, 815 and 817 wait the period of ΔT×1, and then display the portions corresponding to the display devices 814, 815 and 817 in the source image, respectively. The display device 818 immediately displays the portion corresponding to the display device 818 in the source image after receiving the source image.

As shown in FIGS. 10A and 10B, it is obtained that when the display matrix includes multiple daisy chains, the time when the display device actually displays the source image is determined according to the number of the display devices included in the longest daisy chain. It is assumed that the display matrix includes three daisy chains, and the longest daisy chain is composed of four display devices connected in series. Accordingly, the source display device of the display matrix displays the source image after waiting the period of ΔT×3. Similarly, if the longest daisy chain is composed of five display device connected in series, then the source display device of the display matrix displays the source image after waiting the period of ΔT×4.

The embodiment describes that the display matrix of the invention determines the time for each display device to actually display the source image in response to the actual arrangement of the display device. When this display method is adopted, the display devices synchronously display the source image at the same time. Thus, the display quality of the display matrix can be enhanced. It is to be noted that for the sake of simplifying the description, the embodiment assumes that the transmitting time differences between the display devices are equal to ΔT. Upon the practical application, different transmitting time differences (for example, ΔT1, ΔT2 and the like) between the display devices can be considered. That is, the accumulated transmitting time difference serves for synchronizing the display time.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A display matrix, comprising:
   a first display device for transmitting a source image at a first transmitting time point;
   a second display device, serially connected to the first display device via a daisy chain, for receiving the source image at a second receiving time point before a first display time point, wherein the first display time point is determined according to a total number of the display devices in the daisy chain; and
   a third display device, serially connected to the second display device via the daisy chain, for receiving the source image at a third receiving time point which is the same as or before the first display time point, wherein the third receiving time point is later than the second receiving time point, wherein the display devices are arranged in a matrix, and the display devices display the source image at the first display time point, wherein arrangement information comprising the total number, position of each of the first, the second and the third display devices in the daisy chain and arrangement of the matrix is transmitted though the daisy chain.

2. The display matrix according to claim 1, wherein each of the display devices stores the arrangement information.

3. The display matrix according to claim 1, wherein the first display device receives the source image from a host, and when the second display device is disposed at end of the daisy chain, the first display time point is the same as the second receiving time point.

4. The display matrix according to claim 1, wherein the first display device receives the source image from a host, and when the second display device is at a position inside the daisy chain, the first display time point is later than the second receiving time point.

5. The display matrix according to claim 1, wherein the second display device comprises:

a storage module for storing the source image at the second receiving time point; and a display panel, electrically connected to the storage module, for displaying the source image at a second display time point, wherein the second display time point is the same as or later than the second receiving time point.

6. A display device, disposed in a display matrix, wherein the display device is serially connected to a previous stage display device and a next stage display device in the display matrix via a daisy chain, wherein the display device, the previous stage display device and the next stage display device are arranged in a matrix, and the display device comprising:

an image transmission interface, for receiving a source image from the previous stage display device at a receiving time point, and transmitting the source image to the next stage display device at a transmitting time point; and a display panel, for displaying the source image at a display time point according to a relative position of the display device in the display matrix, wherein the display time point is later than the receiving time point and the transmitting time point, and the display time point is determined according to a total number of the display devices in the daisy chain, wherein arrangement information comprising the total number, positions of the display device, the previous stage display device and the next stage display device in the daisy chain and arrangement of the matrix is transmitted though the daisy chain.

7. The display device according to claim 6, further comprising:

a storage module, electrically connected to the image transmission interface and the display panel, for storing the arrangement information.

8. The display device according to claim 7, wherein the storage module stores the source image at the transmitting time point, and provides the source image to the display panel at the display time point.

9. A display method applied to a display matrix comprising a first display device, a second display device and a third display device, wherein the second display device is serially connected to the first display device via a daisy chain, the third display device is serially connected to the second display device via the daisy chain, and the display devices are arranged in a matrix, the display method comprising the steps of:

transmitting a source image by the first display device at a first transmitting time point;

receiving the source image via the daisy chain by the second display device at a second receiving time point;

receiving the source image via the daisy chain by the third display device at a third receiving time point, wherein the third receiving time point is later than the second receiving time point; and displaying the source image by the display devices at a first display time point, wherein the first display time point is determined according to a total number of the display devices in the daisy chain, wherein the first display time point is later than the second receiving time point, and the first display time point is the same as or later than the third receiving time point, wherein arrangement information comprising the total number, position of each of the display devices in the daisy chain and arrangement of the matrix is transmitted though the daisy chain.

10. The display method according to claim 9, further comprising the steps of:

storing the source image by the second display device at the second receiving time point; and displaying the source image by the second display device at a second display time point, wherein the second display time point is the same as or later than the second receiving time point.

11. The display method according to claim 9, further comprising the step of:

storing the arrangement information by the second display device.

* * * * *